April 14, 1959
M. O. McGINNIS
2,881,828
APPARATUS FOR CONTROLLING THE OPERATING TEMPERATURE
OF A DIESEL MOTOR FUEL SYSTEM FLUID
Filed June 8, 1953
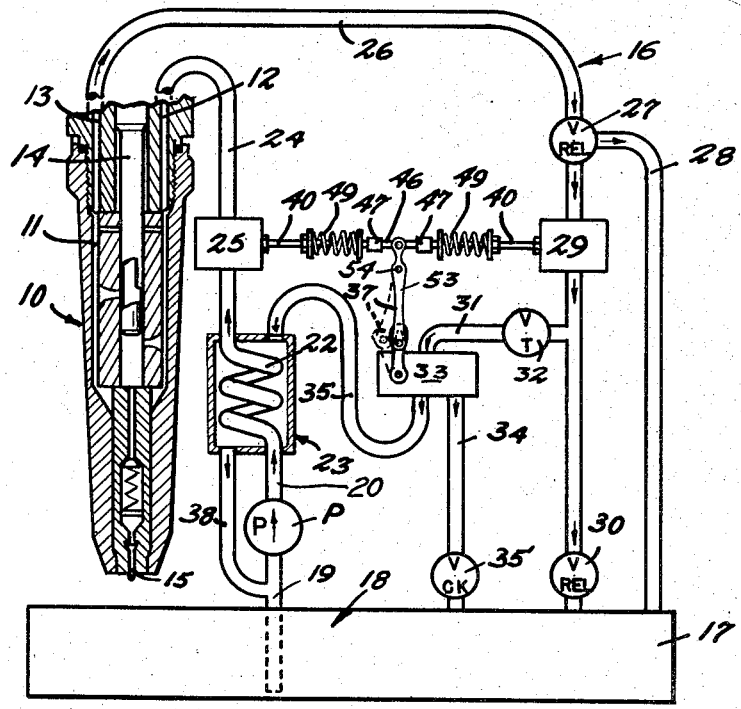
FIG-1
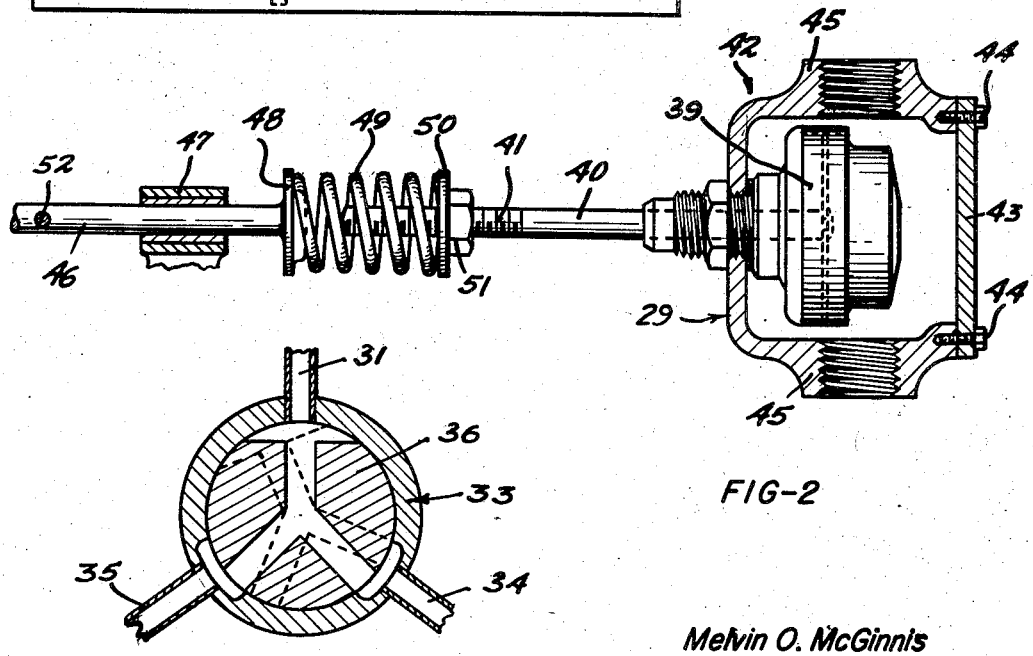
FIG-2
FIG-3
Melvin O. McGinnis
INVENTOR.
BY Glenn L. Fish
Attorney United States Patent Office 2,881,828
Patented Apr. 14, 1959

2,881,828
APPARATUS FOR CONTROLLING THE OPERATING TEMPERATURE OF A DIESEL MOTOR FUEL SYSTEM FLUID

Melvin O. McGinnis, Spokane, Wash.

Application June 8, 1953, Serial No. 360,200

1 Claim. (Cl. 158—36.3)

This invention is an apparatus for controlling the opararing temperature of a diesel motor fuel system fluid.

It is one object of the invention to provide apparatus for maintaining the fuel injectors of an internal combustion engine at a desired temperature which has been determined to be favorable to the operation thereof.

Another object of the invention lies in the provision of apparatus for maintaining a desired operating temperature at a fluid fuel injector, which is adapted to introduce a quantity of the heat-carrying returning fuel into the supply line and varying this quantity directly proportional to the degree of temperature difference of the returning fuel below the desired injector temperature.

Another object of the invention lies in the provision of apparatus for maintaining a desired operating temperature at a fluid fuel injector, which is adapted to exchange the heat from the return line fuel flow to the supply line fuel flow in quantities directly proportional to the degree of temperature difference of the returning fuel below the desired injector temperature.

Another object of the invention lies in the combination and arrangement of parts adapted to control the operating temperature of a fluid injector and thereby assist in peak performance of an engine utilizing the injector.

It is obvious that the invention disclosed herein may be applied to many different types of engines where the fuel injecting or valving parts are machined to close tolerance, and any great variations in temperature of the parts are found to bind or score and cause the injectors to become inoperative. Although this specification and drawing are primarily concerned with disclosing the invention as related to the injectors of a diesel locomotive, it will be understood that the spirit of the invention may be utilized with other types of engines where fluid temperature control is desired and it is not my intention to limit the invention to a diesel injection type locomotive.

Other objects of the invention will become apparent during the course of the following description.

In the accompanying drawings, forming a part of this specification, and in which like numerals are employed to designate like parts;

Figure 1 is a diagrammatic view showing an apparatus using this improved method of maintaining a desired operating temperature at the injector, a fragment of which is shown in vertical cross section;

Figure 2 is a view partially in elevation and partially in cross section taken vertically through one of the temperature-sensitive thermostats; and Figure 3 is a transverse cross section of a distributing valve of the type which will function with the present method.

Referring now more particularly to the drawing, in Figure 1 I have shown a portion of a fuel injector, indicated in general by the numeral 10, which is provided with a fuel containing area 11 having an inlet port 12 and an outlet port 13 communicating therewith. The injector is of the well-known type used in diesel locomotives and has a plunger 14 which meters the amount of fue linjected into the cylinder through the spray tip 15. The details of the injector will not be here described since we are only concerned with the fact that the injector utilizes only a portion of the fuel supplied thereto for injecting into the cylinder and the balance of the fuel is used to lubricate and circulate through the injector and carry away the heat, generated by combustion in the cylinder, through a return line indicated in general by the numeral 16.

The fuel is contained in a supply tank 17 which forms a part of a fuel supply indicated in general by the numeral 18 and including a pipe 19 which communicates a sump in the supply tank with a pump P. The pump draws fuel from the supply tank sump and forces it through the supply line 20 which includes a coil 22 located in a heat exchanger 23 and a pipe 24 communicating with the inlet 12 of the injector 10. Interposed the length of the pipe 24 is a temperature-sensitive thermostat 25. The return line 16 has a pipe 26 which communicates with the outlet 13 of injector 10. A pressure relief valve 27 is interposed in the pipe 26 and has a by-pass pipe 28 which discharges into the supply tank 17. Also interposed in the pipe 26 is a second temperature-sensitive thermostat 29 and from thence the pipe communicates with a second pressure relief valve 30 and discharges into the supply tank 17. A branch line 31 communicates with the pipe 26 between the temperature-sensitive thermostat 29 and the pressure relief valve 30, and has a temperature-sensitive throttle valve 32 intermediate the branch line 31 which communicates at its opposed end with a distributing valve 33. The temperature-sensitive throttle valve is adapted to be normally in an open position, but will close when the temperature of the fuel passing therethrough reaches an excessive point, for convenience of description 250° F.

The distributing valve 33 is shown in Figure 3 as being a valve which when located in the intermediate position will distribute equal portions of the return line fluid through discharge conduit 34 and heat exchange conduit 35. When the rotor 36 of the valve is rotated counterclockwise to the dotted line position, the full flow through branch line 31 will be then directed through conduit 34 and through a check valve 35' into supply tank 17. As the rotor 36 moves from its full line position to its dotted line position, the amount of fluid flow directed to the conduit 34 is inversely proportional to the fluid flow directed to heat exchange conduit 35.

Referring again to Figure 1, the position shown in dotted lines for the valve operating linkage 37 is the exact opposite of the dotted position shown in Figure 3; that is, the fluid flowing through branch 31 is entirely directed through the heat exchange conduit 35. However, the amount flowing through the two conduits 35 and 34 is variable in inverse proportions one to the other.

When the fluid flowing through the return lines leaves the injector 10, it carries with it much of the heat present at the injector because of the combustion in the chamber. This fluid passes through the heat exchanger 23 and much of the heat therein is absorbed by the fluid being pumped through the fuel supply line 20. From the heat exchanger 23 the return fuel flows through a pipe 38 which communicates with the fuel supply pipe 19 above the supply tank and below the pump P. Obviously, either one of the methods of exchanging the heat from the fuel return line to the fuel supply line may be utilized and the direct infusion of the fuel may be omitted and the heat exchanger used, or the heat exchanger omitted and the fuel directly introduced into the supply line.

The operation of the temperature maintaining device is such that when the injector is operating at a temperature a great degree below the desired temperature, which for purpose of illustration will be considered to be between 150° F. and 200° F., the distributing valve 33 is positioned so that the flow of the return line fuel will pass through the heat exchanger and the heat therein will be introduced into the supply line by the heat exchanger and/or the direct introduction through pipe 38. Therefore, the heat carried away by the return line is again introduced into the injector 10 through the supply line 20 and the temperature thereof raised toward the desired operating temperature. As the injector temperature increases near the desired operating temperature, the distributing valve's rotor 36 is rotated in a counterclockwise direction, as viewed in Figure 3, and the amount of return fuel directed through the heat exchanger is diminished proportional to the increase of the amount of return fuel directed through conduit 34. Therefore, less of the heat in the return fuel line is exchanged or introduced into the supply line. The tank 17 is ordinarily a large container which is carried in a place where the heat of the engine does not affect its contents, and the fuel returning to the tank has its heat dissipated within the tank often to the atmosphere where the atmospheric temperature is below that of the return line fuel temperature.

When the temperature of the injector reaches the desired degree, the valve is adjusted to that particular position where only a sufficient quantity, or none, of the return line fuel is used to introduce heat in the supply line 20 and an equilibrium is reached to maintain the injector at the proper temperature. Of course, when the device such as a diesel powered truck is pulling a long hill, the combustion creates more heat and this heat is carried away in the return line and directed either through conduit 34 to the tank or through conduit 35 to the heat exchanger. The greater the heat and the less required at the injector, the more return fuel directed through conduit 34. When the truck is travelling down a hill and the combustion is not heating the injectors above their normal temperature, the valve is operated in the opposite direction to pass more of the heated return line fuel into the supply line and through the heat exchanger to maintain the injectors at the temperature desired.

The temperature-sensitive throttle valve 32 is designed to close completely if the return line fuel 26 reaches a temperature where it is not required through the heat exchanger, and it is then forced through relief valve 30 into the supply tank.

Check valve 35' is disposed to prevent pump P from drawing fuel through conduit 34 and valve 33 into the supply line, thus taking the required fuel in excess of the amount supplied through valve 33 from supply tank 17. The means of operating distributing valve 33 obviously could be wide and varied and could be operated manually through the observation of heat indicating gauges if desired. However, I have provided a unique automatic means which comprises opposed temperature-sensitive thermostats 25 and 29 interposed the supply line 20 and the return line 26, respectively. The temperature-sensitive thermostats each contain a temperature-sensitive element 39 which is hermetically sealed and contains a compound which expands when heated and contracts when cooled. The element itself contains a piston which is actuated by the expansion and contraction of the compound, and the piston actuates a plunger 40 which has a threaded free end portion as at 41. The temperatuure-sensitive element 39 is a commercial element known as a Vernatherm and, therefore, I shall not go into greater description of its operation.

The element 39 is contained within the thermostat housing 42 which has a sealed cover plate 43 for admission of the element. The cover plate is secured in place by means of bolts 44. The housing is provided with threaded bosses 45 which are adapted to receive the pipe of the fuel lines 16 and 20. The plungers 40 of the two thermostats are axially aligned and their ends are spaced from each other. Axially aligned with the plungers and disposed in spaced relation therebetween, I have provided a floating rod 46 which is carried in spaced bearings 47 for reciprocable movement. The rod is provided at its ends with disc-shaped heads 48 against which expansion springs 49 bear. The opposed ends of the springs 49 are biased against washers 50 supported by threaded nuts 51 on the ends 41 of the plungers 40.

Midway the length of the floating rod 46, I have provided a pivot pin 52 and this pivot pin pivotally connects a swinging link 53 which is pivoted at 54 and forms a part of the distributing valve operating linkage 37. When the floating rod 46 is shifted to the right as viewed in Figure 1, the linkage is pivoted as shown to the dotted position thereof, and the valve 33 is rotated counterclockwise to the extreme position opposed to the dotted position shown in Figure 3. As the floating rod 46 is shifted to the left, the valve rotor 36 is rotated in the opposite direction to a degree proportional to the movement of the rod 46. As the heat in the return line 29 actuates element 39, the plunger 40 is shifted to the left or outwardly of the element and the pressure applied to floating rod 46 through spring 49 shifts the rod 46 to the left and rotates the rotor 36 of valve 33 clockwise, causing the return fuel to flow through conduit 35. This in turn increases the temperature of the supply line fluid through thermostat 25 and its plunger moving outwardly attempts to shift rod 46 to the right. The springs 49 compensate for the movement of the plungers, and yet provide an equalized pressure on the ends of rod 46 whereby it may seek a central position between the plungers 40.

As the temperature of the supply line fuel increases to the adjusted point, the movement of thermostat 25 and plunger 40 will cause the valve 33 to rotate to a degree diminishing the flow of return line fluid through the heat exchanger 23. It will thus be seen that the temperature-sensitive thermostats will in time reach an equalized condition where just the amount of return line fuel necessary to maintain the supply line fuel at a temperature required to maintain the desired operating temperature at the injector is passing through conduit 35.

In the event that the return line pressure exceeds that which the return line equipment is reasonably expected to contain, the relief valve 27 by-passes a portion of the fuel through by-pass pipe 28 directly into the supply tank, thus avoiding damage to any of the parts.

Having thus described my invention, I claim:

In a diesel motor fuel system including injectors, a fluid supply, a fluid supply line and a return line exhausting in said supply, in combination, a temperature-sensitive thermostat for each line and actuated by the temperatures of the fluid flowing in said lines, said thermostats having reciprocable plungers shiftable outwardly of their respective thermostat by increase in temperatures, a floating rod axially aligned with said plungers and spaced therefrom, adjustable resilient means disposed between the ends of the floating rod and the plungers whereby movement of the plungers is imparted to said floating rod, a heat exchanger thermally uniting said lines, and a distributing valve in the return line and actuated by movement of said floating rod for directing return line fluid to said heat exchanger in ratio directly proportional to the degree of heat of the fluid in the return line below the desired injectors temperature.

References Cited in the file of this patent

UNITED STATES PATENTS

| | | |
|---|---|---|
| 1,952,516 | Sperry | Mar. 27, 1934 |
| 2,334,679 | Mason et al. | Nov. 16, 1943 |
| 2,425,439 | Puster | Aug. 12, 1947 |
| 2,457,618 | Weisendanger | Dec. 28, 1948 |
| 2,599,699 | Dilworth | June 10, 1952 |
| 2,747,555 | Brunner | May 29, 1956 |

FOREIGN PATENTS

| | | |
|---|---|---|
| 385,661 | Great Britain | Jan. 5, 1933 |